Feb. 1, 1944. L. F. BENDER 2,340,296
TEAT CUP INFLATION
Filed April 25, 1942
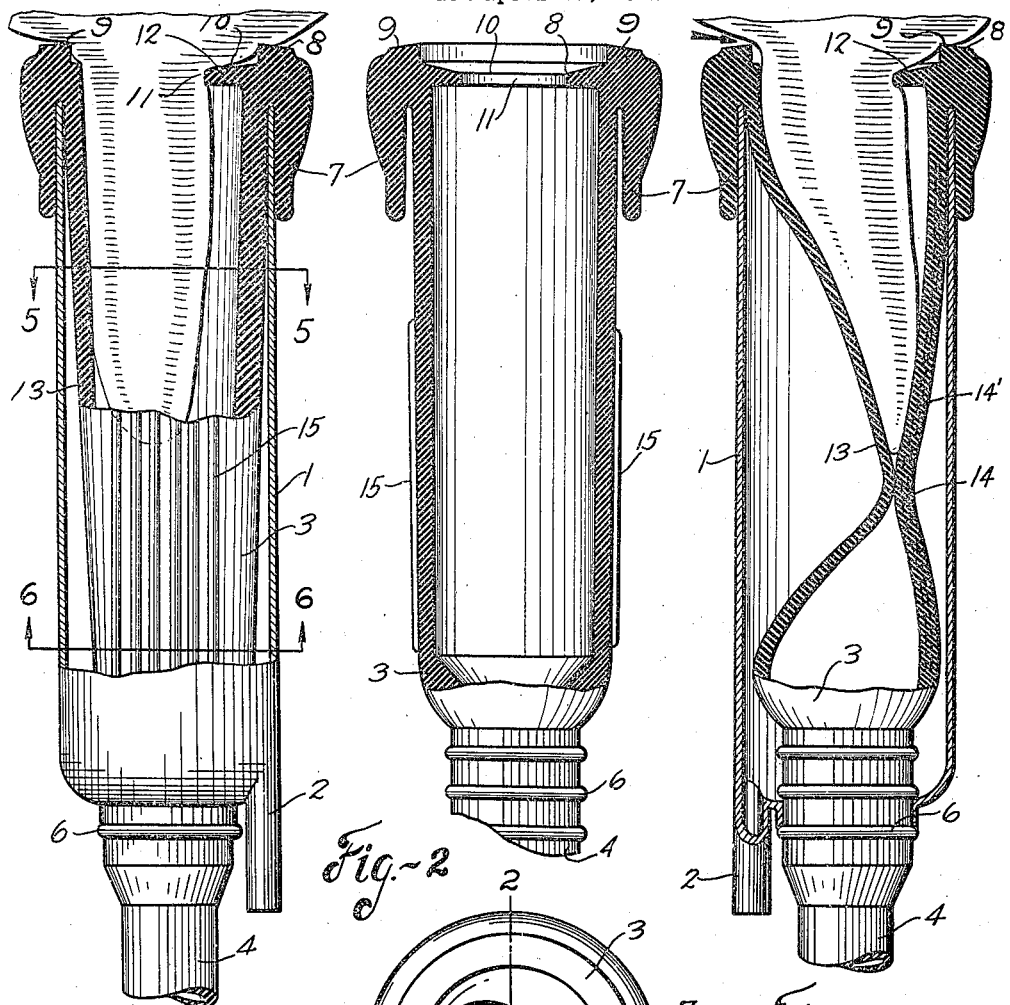
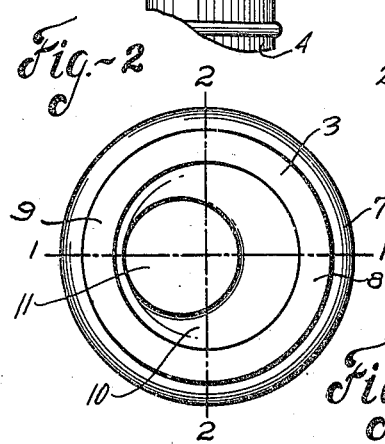
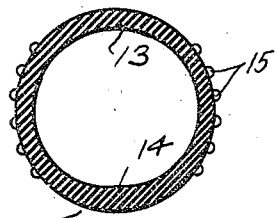
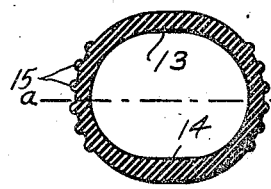
Inventor
Lloyd F. Bender
H. C. Walker
Attorney Patented Feb. 1, 1944

2,340,296

UNITED STATES PATENT OFFICE 2,340,296

TEAT CUP INFLATION

Lloyd F. Bender, Waukesha, Wis., assignor to The Universal Milking Machine Company, Waukesha, Wis., a corporation of Wisconsin Application April 25, 1942, Serial No. 440,529

32 Claims. (Cl. 31—85)

This invention pertains to pulsating teat cups for milking apparatus, and more particularly to a liner or inflation therefor, and to the herein described method of operation.

The present teat cup inflation is so designed that at each pulsation it permits a slight seepage of air past the enclosed teat, without, however, losing the vacuum effect therein. Its shape and proportions are such that it intermittently collapses uniformly under influence of differential internal and external pressures and contracts upon the teat in such manner as to exert squeezing pressure thereon and simultaneously break the seal between the teat cup and the cow's udder while maintaining its engagement with the teat to prevent detachment thereof during momentary admission of air to the interior of the inflation.

In mechanical milking operations it has been found that different cows of the same herd respond differently to the milker action, some of which refuse to "let down" and persist in withholding their milk, and thereby become known as hard milkers, and others require hand testing or "stripping" to greater or less extent after the mechanical milker has been disconnected. Heretofore such difficulties have been attributed to physical incapacities and nervous temperament of the individual cows. However, by experience and practical trial it has been discovered that to a very great extent, if not entirely, such difficulties have been due to the character of the milking apparatus and its mode of operation.

The prior art teaching has been to maintain a hermetically sealed contact of the teat cup with the cow's udder about the base of the teat while the enclosed teat is subjected to constant suction or vacuum and pulsating compression impulses. It has been discovered that the enclosed teat becomes "air locked," thus inducing the objectionable reactions heretofore attributed to peculiarities of the cow. However, by enabling slight seepage of air into the interior of the inflation during the squeeze interval, which air seepage is of insufficient volume to materially reduce the suction or vacuum effect, but ample to momentarily relieve the tension and accelerate the discharge of extracted milk from the teat cup and through the milk tube, it is found that the cows respond more readily, milk out more rapidly and more nearly complete, leaving less residue of milk to be removed by hand stripping.

The entrance of air at atmospheric pressure above or behind the charge of milk in the inflation and milk tube, which otherwise is subject only to low pressure or suction influence, imparts a marked impetus to the milk content of the tube and inflation. At the same time the collapse of the inflation, by which the teat is subjected to a pressure squeeze, will have pressed the teat somewhat beneath a flange or projecting portion of the inflation, which is sufficient to support the teat cup until the air leak closes and full vaccum is again restored, which occurs instantly.

To facilitate the gripping effect of the mouth of the teat cup to prevent detachment during the momentary admission of air, and to further secure the immediate and full compression of the teat by the collapse of the inflation, the teat receiving orifice of the inflation is offset in eccentric relation with the axis of the teat cup chamber.

The action induced in the present inflation is in simulation of the natural sucking action of a calf. The calf first applies suction to the teat to withdraw milk, then as it swallows it forces the teat against the roof of its mouth by tongue action, subjecting it to squeezing and massaging pressure from the tip toward the udder. The present inflation is designed to collapse from one side against the enclosed teat in simulation of the calf's tongue pressure. The teat receiving orifice being offset eccentrically with the axis of the inflation, the opposite side of the inflation is recessed or formed with an overhanging lip or flange at its terminus, against which recessed side and projecting lip the teat is distorted by the unilateral pressure of the collapsed side of the inflation. It is during the momentary squeeze period that a slight leakage of air is effected, in a rhythmic repetitious sequence of suction, pressure and air admission.

The inflation collapse is localized and controlled to insure the necessary degree of pressure in a direction to effect the momentary gripping action by varying the resistance of the inflation wall in relation with the direction of offset or eccentricity of the teat receiving orifice.

Cross reference is made to copending application Serial No. 321,082, filed February 27, 1940, wherein the subject matter of sundry claims hereof was originally disclosed and claimed, the legal benefit of which earlier application as to all common subject matter is asserted.

The object of the invention is to improve the construction as well as the means and mode of operation of milking-machine teat cups, whereby they may not only be economically manufactured, but will be more efficient in use, automatic in operation, uniform in action, and unlikely to get out of repair.

A further object of the invention is to subject the teat to unilateral massage, pressure, and squeeze against a re-entrant abutment in rhythmic sequence.

A further object of the invention is the herein described mode of momentarily by-passing a small quantity of air past the enclosed teat while the inflation is collapsed during the cycle of operation.

A further object is to provide an improved head or udder contact area of the inflation.

A further object of the invention is to provide a teat cup inflation so shaped and proportioned that it will retain its engagement with the teat during intervals of air admission.

A further object of the invention is to effect intermittent increased propulsion of the drawn milk from the inflation and milk tube.

A further object is to provide a teat cup inflation having a shape and action approximating those of a calf's mouth.

A further object of the invention is to momentarily relax the tension on the teat to restore circulation thereto and accelerate milk secretion.

A further object of the invention is to provide a reinforced and improved area of flexure of the inflation wall.

A further object is to provide upon a collapsible teat cup inflation an improved bearing surface for engagement with the teat cup shell.

A further object of the invention is to provide a teat cup inflation having the advantageous structural features and inherent meritorious characteristics, and which enables the beneficial mode of operation herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

Referring to the accompanying drawing, wherein is illustrated the preferred but obviously not necessarily the only form of embodiment thereof, Fig. 1 is a side elevation of a teat cup assembly embodying the present invention partly broken away on the plane 1—1 of Fig. 4.

Fig. 2 is a sectional view of the teat cup inflation removed from the teat cup shell on line 2—2 of Fig. 4 viewed at right angle to that shown in Fig. 1.

Fig. 3 is a further sectional view in the plane 1—1 of Fig. 4 on which the section of Fig. 1 is also taken, illustrating the teat cup inflation in collapsed condition.

Fig. 4 is a top plan view of the teat cup and inflation.

Fig. 5 is a transverse sectional view of the inflation on line 5—5 of Fig. 1.

Fig. 6 is a similar sectional view of the inflation on line 6—6 of Fig. 1.

Like parts are indicated by similar characters of reference throughout the several views.

In the accompanying drawing, 1 is a conventional teat cup shell of generally cylindrical form, open at its top and somewhat contracted at its lower end, and provided with a lateral spud or nipple 2 which communicates with the interior of the shell. The particular shape and proportion of the teat cup shell is not material to the present invention. Interiorly of the shell is a flexible tubular inflation 3, preferably of rubber or some other pliable material, which is preferably substantially straight in one diametrical plane, as shown in Fig. 2, but is tapered in its transverse diametrical plane. As a result, the inflation is of somewhat oval or elliptical cross sectional shape, as shown in Fig. 6, the proportions of which progressively vary in different zones.

At its lower end the inflation 3 continues as an integral milk tube 4, which at its juncture with the body of the inflation is enlarged to fit the opening in the contracted end of the shell, and is provided with peripheral corrugations 6 for sealing engagement with the end of the shell. The integral character of the milk tube and inflation is not necessary to the present result, and these parts may be separately formed and intercoupled in any suitable manner, as is common in this art.

At its top the inflation extends beyond the terminus of the shell and is provided with a surrounding dependent skirt 7 which exteriorly overlaps the upper portion of the shell and hermetically seals the joint between the inflation and the shell. The top 8 of the inflation is adapted to make a hermetically sealed contact with the udder during the greater portion of the operating cycle. The terminal face of the inflation is provided with a concentric bead or rib 9 in proximate relation with the periphery of the inflation top within which is a depressed seating area 10 for the udder. Within the depressed seat 10 of the inflation head is a teat receiving opening 11 of less diameter than the interior of the inflation, and which in the present instance is laterally offset in eccentric relation with the axis thereof. The opening 11 is tangential to one side of the inner surface of the inflation. Consequently, at the opposite side of the inflation there is an inwardly projecting or overhanging flange or lip 12 of quite appreciable extent.

Under influence of continuing suction or vacuum interiorly of the inflation and alternating suction and atmospheric pressure exteriorly thereof within the surrounding space intermediate the inflation and the wall of the teat cup shell, the inflation is caused to periodically collapse on its major diameter a—a of Fig. 6. Being free for vibratory warping action within the shell, it momentarily assumes a contracted, substantially "hour glass" shape as in Fig. 3 wherein the side wall 13 is collapsed to an extreme degree and applies pressure to the teat against the opposite side 14 which will be contracted but slightly. The inflation is liable to become slightly twisted or distorted into contact with the interior of the shell on its major axis and the hinge line or area flexure may be caused to wipe upon the interior of the teat cup shell.

To reinforce the inflation wall and reduce contact area thereof with the interior of the teat cup shell, plural longitudinal corrugations, comprising beads or ribs 15 are formed within the flexure areas on opposite sides of the inflation. These ribs act as spacers between the inflation and the wall of the shell and reduce friction without, however, interfering with the flexing action of the inflation on longitudinal hinge lines, parallel with the corrugations.

During the interval that the internal and external pressures on the inflation are substantially equalized and the inflation expanded, the enclosed teat hangs relatively free as in Fig. 1 in closely adjacent relation to that side of the inflation to which the teat receiving opening 11 is substantially tangential. In order that collapse of the inflation may occur from the last mentioned side thereof, the walls of the inflation are of different resistance to flexing motion. The wall of the inflation coincident with and overhung by the flange or lip 11 is of greater thickness or otherwise of greater resistance to distortion than the opposite wall.

The wall which is overhung by the flange or lip 11 is ordinarily made three-sixteenths of an inch thick while the collapsing side which is tangential to the opening 11 is five-thirty-seconds of an inch thick. However, these dimensions are mentioned merely for illustrative purpose and the differential thickness of the respective walls may be greater or less than the dimensions mentioned. Otherwise one side may be of stiffer composition than the other or may be reinforced to stiffen it to greater resistance than the opposite side as shown at 14', Fig. 3.

The result achieved, by whatever means, is that by collapse of the inflation the teat is pressed laterally against and under the flange or lip 12 as indicated in Fig. 3. This causes a constriction of the teat at its base, and the teat cup is momentarily supported by the relatively larger diameter of the teat beneath such constriction together with the reduced suction thereon. At the same time the lateral deflection of the teat within the inflation presses the base of the teat away from the top of the inflation and the seating rib 9 away from the udder at the side opposite the lip or flange 12, sufficiently to momentarily admit a slight charge of air. Such admission of air occurs at each collapse of the inflation and compression of the enclosed teat while the latter is subject to suction influence. The amount of air thus admitted is insufficient to destroy the vacuum or to release the teat cups, which in addition to the adhesion incident to continuing suction effect are momentarily suspended on the swell of the compressed teat below the lip or flange 11.

Obviously, if a too great body of air is admitted, the vacuum would be destroyed and the teat cup will be released and caused to fall. However, restriction of the air admission by merely momentarily breaking the seal between the inflation top and the cow's udder avoids detachment of the teat cup. It is found quite effective and beneficial after subjecting the enclosed teat to maximum suction, to momentarily reduce the suction influence by admitting such small charge of air at atmospheric pressure behind the charge of milk in the inflation chamber by which evacuation of milk therefrom is accelerated. While other forms of air inlet valves for controlling admission of air to the inflation chamber may be employed, for simplicity, economy and effective operation it is preferred to utilize the inflation head and the engaged area of the cow's udder as such air control valve, as herein described.

The construction and arrangement is such that while the inflation head will normally seat against the cow's udder sufficiently tight to hermetically seal the inflation chamber, when suction or vacuum within the inflation chamber reaches a maximum admission of air to the surrounding jacket or teat cup shell effects collapse of the inflation, and the external atmospheric air pressure overcomes the sealing resistance which has been somewhat weakened by the distortion of the inflation, and a very small charge of air rushes in.

At the moment the air is admitted at the top of the inflation, the lower part thereof is filled or partially filled with milk. The milk charge being subject to low pressure suction effect exerted from below through the milk tube, the atmospheric air thereabove exerts an impelling influence which greatly accelerates the evacuation of the milk from the inflation through the milk tube to a receiver. The inflation and milk tube are thus quickly cleared of milk accumulation preparatory to the succeeding cycle of impulses. This is found quite beneficial in inducing a greater flow of milk and enables faster and more thorough milking of cows of the slow and hard-milking type.

By the method herein described, the enclosed teat is subjected to three distinct influences during each cycle, to wit, an initial suction incident to the vacuum induced within the inflation, a compressive squeezing action upon the teat starting at its end and progressing upwardly, by which the blood is returned and congestion avoided, and a sudden relaxation of suction influence and rise of pressure by admission of air at the top of the inflation whereby air pressure influence is exerted initially at the base of the teat and thence progressively downward. As a result thereof, milking of even "hard milkers" is more completely accomplished and but little residue of "strippings" is left for hand extraction.

The eccentric teat receiving opening in close relation with the collapsing wall 13 of the inflation enables the inserted teat to maintain more or less constant contact with the vibrating wall 13 in much the same manner that it maintains contact with a calf's tongue. The teat is intermittently pressed against the opposite wall 14 of the inflation by the collapse of the wall 13 in a manner analogous to the pressure of the teat against the roof of the calf's mouth. At the same time the teat is pressed about the lip or flange in a manner simulating the engagement of the upper jaw of the calf with the teat.

The upstanding bead or rib 9 tends to slightly embed itself in the surface of the udder whereby an effective air seal is maintained, except when the inflation is distorted by collapse of the wall 13 which strains one side of the contacting rib sufficiently to partially unseat a limited area thereof and thereby permit the slight air leakage, which is found highly advantageous in the manner and for the purpose described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A teat cup inflation for a milking apparatus, comprising a flexible tubular body periodically collapsible under fluctuations of relative internal and external pressures, the opposite walls of which are differently resistant to collapsing influence, a terminal seating surface thereon for sealing contact engagement with a cow's udder, and having therein a teat receiving orifice disposed substantially tangential to the interior surface of the inflation side wall of lesser resistance, and a flange defining the opposite side of the teat receiving orifice and overhanging the side of the inflation of greater resistance to collapsing influence, the construction and arrangement being such that upon collapse of the inflation the side wall of lesser resistance will press an inserted teat laterally against the opposite side wall of greater resistance to collapsing influence beneath the overhanging flange and will constrict the teat against said flange while the contact seal against the cow's udder is momentarily broken by the distortion of the inflation to admit a small charge of air at atmospheric pressure without releasing the inflation from the inserted teat.

2. A teat cup inflation for a milking apparatus, comprising a collapsible tubular body, the interior of which is subjected to suction influence, and the opposite sides of which are differently resistant to collapsing movement, a bearing head at one end of the body for hermetically sealed contact engagement with a cow's udder, a teat receiving orifice within the area of the contact engagement thereof with the udder and in tangential relation with the interior face of the side of the inflation of lesser resistance to collapsing movement, and in spaced relation with the opposite side thereof, and a projecting ledge overhanging the side of the inflation of greater resistance to collapsing movement, the construction and arrangement being such that an inserted teat will normally hang closely adjacent to the side of the inflation of lesser resistance and upon collapse of the inflation the inserted teat will be distorted by being pressed by the side of the inflation of lesser resistance against the projecting flange and therebeyond against the side of the inflation of greater resistance, and such that the distortion of the inflation incident to such collapse will momentarily break the seal of the bearing head of the inflation with the cow's udder to admit a small charge of atmospheric air to the interior of the inflation.

3. A teat cup inflation for a milking apparatus, comprising a collapsible body subject to interior vacuum influence, a seating area at one end thereof engageable with a cow's udder having breakable hermetically seating area therewith for intermittent admission of air past such seal to the interior of the inflation, and compression means for suspending the inflation upon an inserted teat during the periodic breaking of the seal.

4. A milking apparatus teat cup, including a shell, a flexible tubular inflation therein subject to internal suction and external alternating suction and pressure impulses, and a terminal seat thereon for contact engagement with the udder of a cow, having therein a teat receiving opening in eccentric relation with the axis of the inflation.

5. A milking apparatus teat cup, including a shell, an expansible and contractible tubular inflation unit therein having in its terminal a teat receiving opening in eccentric relation with the inflation, the construction and arrangement being such that an inserted teat normally hangs in proximate contact relation with the interior of the inflation at one side thereof and in spaced relation with the interior of the inflation at the opposite side thereof.

6. A milking apparatus teat cup, including an inflation to receive a cow's teat, the opposite side walls of which are differentially resistant to collapsing influence, the side wall of lesser resistance being disposed to make substantially constant contact engagement with an inserted teat, and the wall of greater resistance being normally spaced from the inserted teat, and against which the teat is laterally displaced by collapse of the wall of lesser resistance.

7. A milking apparatus teat cup inflation, having a relatively straight side wall of lesser resistance to collapsing influence and an opposite reentrant recessed side wall of greater resistance to collapsing influence against which an inserted teat is pressed by collapse of the lesser resistant straight wall thereof.

8. A milking machine teat cup inflation which simulates a calf's mouth in sucking, including a flexible side wall responsive to collapsing influence simulating a calf's tongue and in contact with which an inserted teat normally rests, and an opposite side wall of greater resistance to collapsing influence simulating the roof of a calf's mouth, including a terminal flange projecting toward the less resistant side wall in simulation of the upper jaw of a calf's mouth, against the margin of which flange and the recessed area of the wall of greater resistance therebeyond an inserted teat is intermittently compressed by the pulsating collapse of the side wall of lesser resistance.

9. A teat cup inflation for a milking apparatus, comprising a flexible tubular body having a terminal teat receiving orifice the opposite sides of which are differentially resistant to collapsing influence, the interior face of the lesser resistant side wall being substantially straight and the inner surface of the side wall of greater resistance being outwardly offset interiorly of the inflation relative to the corresponding margin of the teat receiving orifice, the construction and arrangement being such that the tubular inflation is constricted at one side only of its teat receiving orifice.

10. A teat cup inflation for a milking apparatus, comprising a flexible tubular body having in its terminal a teat receiving orifice in eccentric relation with the body of the inflation.

11. A teat cup inflation for a milking apparatus, comprising a flexible tubular body having in its terminal an eccentrically positioned teat receiving opening in substantially tangential relation with the interior surface of one side wall of the teat receiving chamber of the tubular body and an inwardly projecting flange overhanging the opposite side wall of the teat receiving chamber of the tubular body.

12. A teat cup inflation for a milking apparatus, comprising a flexible tubular body the opposite side walls of which are differently resistant to collapsing influence upon the inflation, and having in its terminal an eccentrically disposed teat receiving opening in substantially tangential relation with the interior surface of the lesser resistant side wall and inwardly offset relative to the inner surface of the side wall of greater resistance to collapsing influence.

13. A teat cup inflation for a milking apparatus, comprising a flexible tubular body having in its terminus a teat receiving opening, and an overhanging segmental terminal wall defining one side only of the teat receiving opening.

14. A teat cup inflation for a milking apparatus, comprising a flexible tubular body responsive to collapsing influence having in its terminus a teat receiving orifice and a transverse inwardly projecting flange upon one side wall adjacent said opening, against which an inserted teat is pressed by collapse of the opposite side wall of the inflation.

15. A teat cup inflation for a milking apparatus, comprising a flexible tubular body responsive to collapsing influence, a contact sealing area at one end thereof engageable with the udder of a cow, said body having a teat receiving orifice within the confines of the contact sealing area and in eccentric relation with the axis of the flexible tubular body.

16. A teat cup inflation for a milking apparatus, comprising a flexible tubular body responsive to collapsing influence, an udder seating area at one end thereof, and an upstanding annular rib upon the seating area for making hermetic sealing engagement with the udder, said tubular body having a teat receiving opening communicating therewith within the seating area and in relatively spaced eccentric relation with the annular sealing rib.

17. A teat cup inflation for a milking apparatus, comprising a flexible tubular body responsive to collapsing influence, an udder seating area at one end thereof, and an upstanding annular rib upon the seating area for making hermetic sealing engagement with the udder, said tubular body having a teat receiving opening communicating therewith within the seating area and in eccentric relation with the annular sealing rib.

18. An inflation for a milking machine teat cup, including a collapsible tubular body, an annular rib and a depressed bearing surface interiorly of the rib forming an udder sealing area at one end thereof, said inflation having a teat receiving orifice communicating with the interior of the inflation within the udder sealing area and in eccentric relation with the annular rib.

19. An inflation for a milking machine teat cup, including a collapsible tubular body, the opposite sides of which are differently resistant to collapsing influence, and having a teat receiving orifice in one end thereof in eccentric relation with the tubular inflation and in closer relation to the side of lesser resistance to collapsing influence than to the side of greater resistance thereto.

20. The herein described method of simulating the sucking action of a calf, including the steps of intermittently subjecting the cow's teat to unilateral pressure against an unaligned abutment surface resembling the roof of a calf's mouth and overhanging upper jaw, and simultaneously subjecting the teat to suction and progressive variation of the degree of pressure.

21. An inflation for a milking machine teat cup, including a flexible tapered tubular body of progressively and uniformly changing shape, size and resistance to collapsing influence in proportional ratio one to the other from its smaller to its larger end, and a head for said inflation including an un-uniform surface for sealing contact with a cow's udder under suction influence of a vacuum induced within the inflation, said un-uniform surface being adapted to locally yield to external air pressure at maximum suction to permit entrance of a small air charge without destroying the suction effect of the inflation upon the udder.

22. The herein described method of mechanical milking, wherein a cow's teat is projected within a chamber hermetically sealed by engagement of the top of the chamber with a cow's udder, including the steps of subjecting the teat to suction influence by inducing a partial vacuum thereabout, increasing the pressure within the chamber by momentarily breaking the seal between the top of the chamber and the udder thereby admitting a charge of air thereto by which the enclosed teat is subjected to external pressure.

23. The herein described method of mechanical milking, wherein a cow's teat is subjected to alternating suction and pressure influence within a hermetically sealed chamber, including the steps of subjecting the teat to suction influence by inducing a partial vacuum thereabout whereby the teat structure is relaxed and distended, admitting a charge of air to said chamber to thereby increase the external pressure upon the teat therein, and thereafter exerting increased pressure upon the teat from the end thereof progressively upward.

24. The herein described method of mechanical milking, wherein a cow's teat is subjected to alternating suction and pressure influence within a hermetically sealed chamber, including the steps of subjecting the enclosed teat to suction influence of an induced partial vacuum within the chamber, momentarily admitting a small charge of air to the chamber in proximity to the base of the teat whereby the teat is subjected to an increase of external pressure progressively from its base toward its end and subsequently subjecting the teat to further increased pressure progressively in reverse direction from its end toward its base.

25. The herein described method of mechanical milking, wherein a cow's teat is subjected to alternate suction and to pressure influence progressively from its end toward its base, including the step of subjecting the teat to an intermediate reduction of suction influence preparatory to the final pressure.

26. The herein described method of mechanical milking, wherein a cow's teat is enclosed in a teat cup inflation maintained in sealing contact with the cow's udder under influence of vacuum induced within the inflation, including momentarily breaking the contact seal between the inflation and udder to admit a charge of air without destroying the vacuum, and thereafter collapsing the inflation to effect pressure upon the enclosed teat.

27. A milking machine teat cup inflation of flexible material, including a head for sealing contact engagement with a cow's udder under influence of a vacuum induced within the inflation, and an un-uniform contact surface upon the head, the construction and arrangement being such that the seal will be momentarily broken under maximum vacuum influence to admit a small charge of air at atmospheric pressure between the inflation head and udder without completely destroying the vacuum.

28. A milking machine teat cup inflation of flexible material, including a head and an embossed contact surface on said head for engagement with a cow's udder, the construction and arrangement being such that under maximum vacuum influence induced within the inflation the contact seal between the head and udder will be momentarily broken to admit a small charge of atmospheric air, thereby increasing external pressure upon an enclosed teat without destroying the vacuum.

29. A teat cup assembly including an inflation, a head for sealing contact engagement with a cow's udder under internal suction influence, including an ununiform area thereon for locally minimizing the resistance to admission of air to permit entrance of a small charge of air to increases the internal pressure without destruction of the sealing influence.

30. A teat cup inflation, including a head for sealing contact engagement with a cow's udder under internal suction influence, and a configuration on the head of the inflation, the construction and arrangement being such that intermittent admission of atmospheric air is enabled intermediate the inflation head and the cow's udder to the interior of the inflation under maximum suction influence while maintaining sub-atmospheric pressure within the inflation.

31. The herein described method of mechanical milking, including subjecting a cow's teat to suction influence of an induced vacuum thereabout, subjecting the teat to increased external pressure by application of air pressure initially at the base of the teat and finally subjecting the teat to progressive squeezing compression from its end toward its base, in continuous cyclic repetition.

32. The combination with a teat cup for milking purposes wherein a sub-atmospheric pressure is induced, of a cap therefor for hermetically sealed contact engagement with a cow's udder, including a bearing area on the contact surface of said cap the resistance of which to entrance of atmospheric air to the teat cup is adapted to locally yield under maximum vacuum conditions within the teat cup to admit a restricted quantity of air thereto insufficient to destroy the vacuum therein.

LLOYD F. BENDER.